Feb. 22, 1944. R. P. SCHERER 2,342,372
CAPSULE
Filed June 6, 1940
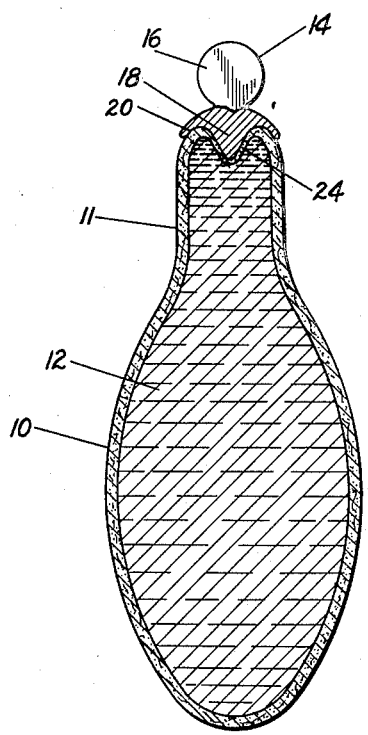
Fig. 1.
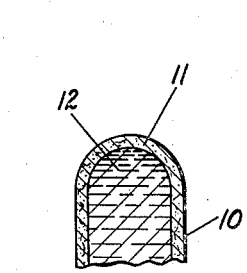
Fig. 2.
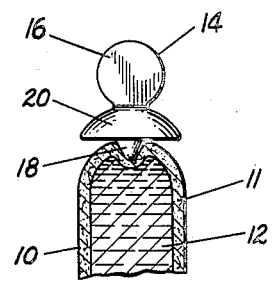
Fig. 3.
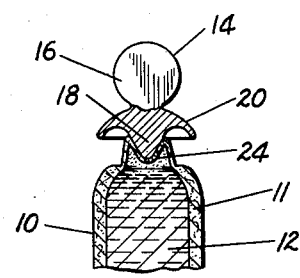
Fig. 4.
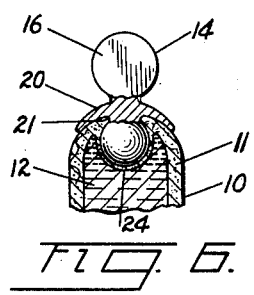
Fig. 6.
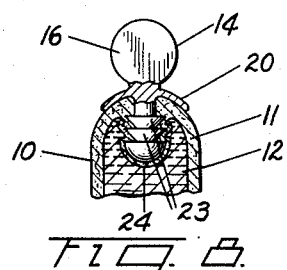
Fig. 8.
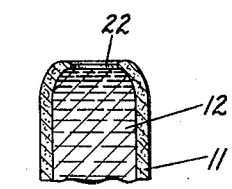
Fig. 5.
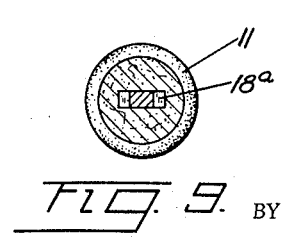
Fig. 7.
Fig. 9.
INVENTOR.
Robert P. Scherer
BY Parker P. Burton
ATTORNEYS Patented Feb. 22, 1944

2,342,372

UNITED STATES PATENT OFFICE 2,342,372

CAPSULE

Robert P. Scherer, Detroit, Mich.

Application June 6, 1940, Serial No. 339,106

12 Claims. (Cl. 221—60)

This invention relates to an improved dispensing capsule.

An object is to provide an improved capsule which may be readily opened to dispense, as desired, the capsule contents and which may be opened without the use of auxiliary instruments.

A further object is to provide such a capsule which presents an attractive appearance, which is hermetically sealed, which is simple and inexpensive, which may be easily opened to discharge its contents and which is provided when opened with a discharge outlet of sufficient size to permit rapid ejection of the contents.

The capsule has a shape which facilitates discharge of its contents but generally such shape is conventional and the novelty resides in the provision of a capsule characterized as herein described and capable of being quickly and easily opened.

Preferably the capsule is formed of gelatin or other suitable thermoplastic material. It includes an opening element so embedded within the capsule wall that upon withdrawal of the element a portion of the wall is broken away forming an opening for discharge of the contents. The opening element is exposed exteriorly of the capsule to be grasped for withdrawal.

Other objects, advantages and meritorious features of the improved capsule will more fully appear from the following description, appended claims and accompanying drawing, wherein:

Figure 1 is a vertical sectional view through a capsule embodying this invention, Fig. 2 is a vertical sectional view taken on the same line of Fig. 1 through a fragment of such capsule prior to the embedding of the opening element within the capsule wall, Fig. 3 is a sectional view taken on the same line as Fig. 2 and through a similar fragment illustrating the insertion of the opening element into the capsule wall, Fig. 4 is a sectional view taken on the same line as the earlier figures through a fragment of the capsule and illustrating the withdrawal of the opening element from the capsule wall, Fig. 5 is a vertical sectional view taken on the same line as the earlier figures through a fragment of the capsule and illustrating the same after the opening element has been removed, and Figs. 6, 7 and 8 represent modified shapes of opening elements and Fig. 9 is a section on line 9—9 of Fig. 7.

Capsules of the character herein illustrated may be provided for any purpose wherein it is desired to provide a capsule from which the contents may be readily dispensed for use. Such capsules may be used for medicaments. They may be used to carry cosmetics such as lotions or creams in amounts sufficient for a single application. The character of the contents and use to which it is put forms no part of the invention.

The particular capsule here shown is generally of a bottle-like shape. Such shape is adapted for squeezing out the contents through the opened neck. While such general shape is conventional, the invention resides in the provision of a capsule characterized with the opening means herein disclosed. Any desired shape of capsule may be employed.

Such capsules are commonly formed of gelatin as this is a suitable material from which to make the capsule wall. It is obvious however that other plastic materials might be employed. Throughout the drawing the capsule wall is indicated with the numeral 10 and the capsule contents by the numeral 12. The capsule will be formed and filled according to any conventional practice. Such capsules might be fabricated and filled as shown in the patent of this applicant, No. 1,970,396. A capsule so constructed has an integral wall and is hermetically sealed.

There is provided what may be termed an opener or opening element indicated generally as 14. It has a disc shaped gripping portion 16, a blunt protuberance 18 which is adapted to be embedded within the capsule wall and an overhanging skirt or wing like portion 20 adapted to surmount the end of the neck 11 of the capsule shell.

The protruding portion 18 is generally in the shape of a cone rounded off at the apex. In Fig. 9, however, which is a section on Fig. 7, the protruding portion, there indicated as 18ª, is flat instead of conical, but with a thickness sufficient to form a free flowing discharge outlet.

In Fig. 6 the protruding portion is restricted at 21 so as to cause the gelatin to cling thereabout more securely while in Fig. 7 the protruding portion is in the shape of a half round disc. In Fig. 8 the shank of the protruding portion is provided with serrations 23 which increase the tenacity of engagement of the gelatin thereabout. In the structures shown in these Figs. 6, 7 and 8 there is mechanical interlocking of the opening element with the capsule wall as well as adhesive securement.

This opening element may be formed of metal or any other suitable material. To insert or embed it within the wall of the capsule the protruding portion 18 may be heated to such a temperature that it will, when urged against the end of the neck of the capsule as shown in Fig. 2, soften or fuse the gelatin or whatever other material is used and as it is urged inwardly the overlying wall portion will be deflected inwardly and thin out to form a thin film over such protruding portion as shown in Fig. 1. Such heated film adheres to the protruding portion 18 of the opening element.

It is desirable that such protruding portion be blunt at the end so as not to pierce its way through the wall. It is desirable that the temperature to which it is heated be controlled so that it will not burn its way entirely through the gelatin wall. If the protruding portion 18 were forced entirely through the wall the content material would tend to leak out sufficiently to prevent secure adhesion. Under certain circumstances interaction of the content material with the opening element would result. When the insertion is made as shown in Fig. 1 there is a hermetic seal by the capsule wall albeit through a substantially thinned out portion overlying the opening element.

Preferably the protruding portion 18 has a depth which exceeds substantially the wall thickness so that the wall is deflected inwardly and the embedded portion of the opening element projects into the interior of the capsule but does not break through the wall. The corresponding disc 16 of course projects outwardly away from the wall. The overhanging skirt 20 protects the thinned out wall portion and positions the opening element upon the capsule and when removed a discharge opening 22 of substantial size is provided. This skirt also increases surface for adhesion.

The adhesion of the thinned out film of wall 24 to the protuberance 18 is such that when the opening element is withdrawn from the capsule the film pulls away therewith and breaks away from the remainder of the capsule wall 10 so as to provide a discharge opening of sufficient size to permit ready ejection of the capsule contents. Should the film fail to break away from the capsule wall as it is pulled outwardly as shown in Fig. 4 it can be grasped above the end of the capsule and severed. Such film, because of its excessive thinning out as compared with the remainder of the capsule wall, presents an area which would be very easily ruptured upon removal of the opening element should the film not pull out therewith.

It is recognized that if a pin or other small sharp instrument is forced through the wall and an attempt made to eject the contents therethrough it is difficult to do it because of the tendency of the pin opening to constrict. This particular invention makes it unnecessary to provide an auxiliary opening device such as shears or the like to cut off the end of a capsule to eject the contents. The opening element here shown forms a part of the complete capsule structure. It is simple, inexpensive, and effective.

What I claim:

1. A capsule carrying content substance and having a wall portion, an opening element separate and distinct from said wall embedded therein without projecting entirely therethrough, that portion of the wall extending over the embedded opening element interiorly of the capsule being thinned out substantially as compared with the normal wall thickness so as to be easily ruptured upon removal of the opening element.

2. A capsule carrying content substance and having a wall portion, an opening element separate and distinct from said wall embedded therein without projecting entirely therethrough and exposed exteriorly thereof, that portion of the capsule wall immediately overlying that portion of the opening element embedded therein being attached to the opening element in such a manner as to break away therewith providing a discharge opening through the capsule wall upon removal of the opening element.

3. A hermetically sealed integral capsule carrying content substance and having a wall portion provided with an opening element embedded therein and exposed exteriorly thereof, that portion of the opening element embedded within the capsule wall having a depth substantially greater than the wall thickness and projecting into the interior of the capsule but not extending through the capsule wall, said capsule wall immediately overlying said embedded portion being stretched over and secured to the embedded portion of the opening element in such a manner as to break away from the remainder of the capsule wall forming a discharge opening therethrough upon removal of the opening element.

4. A hermetically sealed capsule carrying content substance and having a wall portion provided with an opening element embedded therein and having a gripping portion projecting exteriorly thereof, that portion of the opening element embedded within the capsule wall being blunt at the end and having a depth substantially greater than the wall thickness and projecting into the interior of the capsule but not extending through the capsule wall, the capsule wall immediately overlying the embedded portion of the opening element being reduced to the thickness of a thin film and stretched over and secured to the embedded portion of the opening element in such a manner as to break away from the remainder of the capsule wall forming a discharge opening therethrough upon the removal of the opening element.

5. A gelatin capsule carrying content substance, said capsule having a neck portion, an opening element having a part embedded within the end of said neck portion and having a gripping part projecting outwardly therebeyond, said embedded part having a depth greater than the thickness of the capsule wall and projecting into the interior of the capsule but without extending through the capsule wall, the capsule wall extending over said embedded portion being attached to said embedded portion to pull away therewith upon removal of the opening element forming a discharge opening through the capsule wall.

6. A hermetically sealed thermoplastic capsule carrying content substance, a separate and distinct opening element having a part embedded within the capsule wall and secured by fusion thereto, said wall portion overlying said embedded part interiorly of the capsule being thereby adhesively secured to the embedded part so as to draw away therewith upon withdrawal of the opening element outwardly away from the capsule rupturing the capsule wall and providing a discharge opening.

7. A capsule carrying content substance and having a wall portion provided with an opening element embedded therein without projecting through the wall interiorly of the capsule but exposed exteriorly thereof, said opening element provided with a skirt portion exteriorly overlying the capsule wall immediately adjacent the point of embedment of the opening element therein, said element secured to the capsule wall in such manner that upon withdrawal of the element the wall is broken away at the point of embedment forming a discharge opening through the wall for the content substance.

8. A capsule carrying content substance having a wall portion provided with a separate and distinct opening element embedded therein without projecting interiorly through the wall but exposed exteriorly thereof, said opening element secured to the capsule wall by adhesion and mechanical interlocking so that upon withdrawal of the element the wall is ruptured at the point of embedment forming a discharge opening through the wall for the content substance.

9. A capsule carrying content substance and having a wall portion provided with a separate and distinct opening element embedded therein, that portion of the wall extending over the embedded opening element interiorly of the capsule being thinned out substantially as compared with the normal wall thickness and secured to the opening element so as to readily rupture upon withdrawal of said element forming a discharge opening through the wall for the content substance.

10. The combination of a gelatin capsule carrying content substance and a separate and distinct element associated therewith and adapted for removal therefrom to provide a content removal opening, said element comprising opposed end portions separated by a restricted neck portion of less cross sectional dimension than the inner end portion said element being interengaged with said capsule by constriction of the capsule wall about the restricted neck portion of said element between the end portions.

11. The combination of a gelatin capsule carrying content substance and a separate and distinct opening element associated therewith and adapted for removal therefrom to provide a content removal opening, said eleemnt having an outer end portion and an inner end portion, said end portions being spaced apart by a neck portion of less cross sectional dimension than the inner end portion, said element having its inner end portion and its neck portion embedded within the wall of the capsule with the capsule wall constricted about said neck portion, said element having a skirt portion adjacent to its outer end portion and overhanging the adjacent portion of the capsule wall.

12. The combination of a gelatin capsule carrying content substance and having a neck portion and a separate and distinct opening element embedded within the end of said neck portion of the capsule and adapted for removal therefrom to provide a content removal opening, said element having an outer end portion disposed exteriorly with respect to the capsule wall when the element is embedded within said wall and adapted to be grasped for removal of the element from the wall, said element having an inner end portion spaced from the outer end portion by a neck portion of less cross sectional dimension than the inner end portion, said element being interengaged with the capsule wall by constriction of the wall about the neck portion element.

ROBERT P. SCHERER.